LEO I. KAPLAN
INVENTOR.

BY
ATTORNEYS

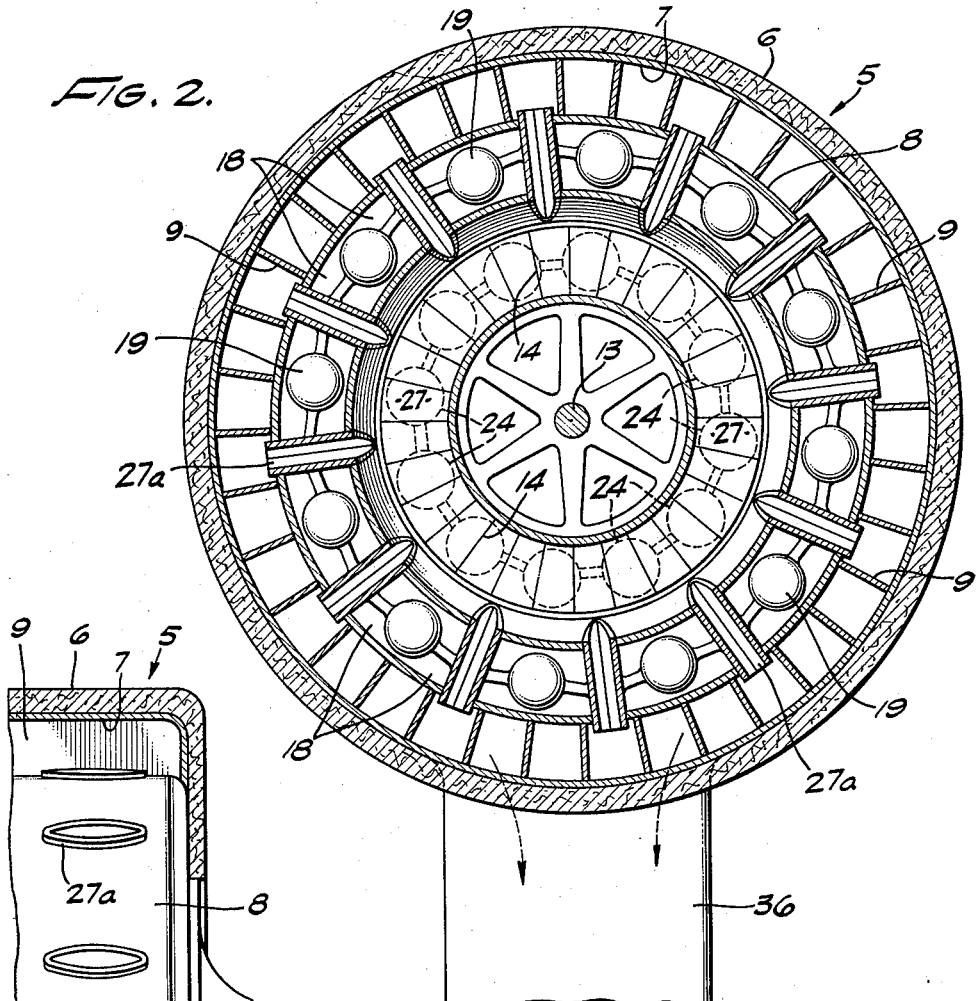
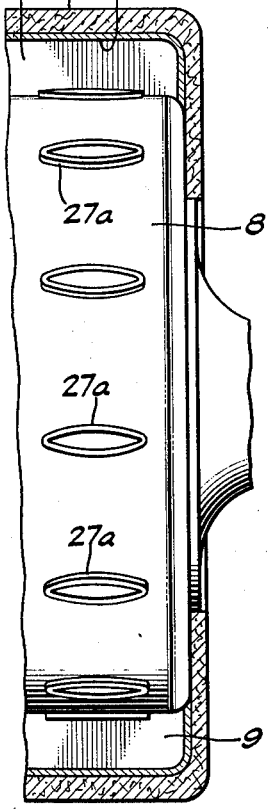

United States Patent Office 2,914,918
Patented Dec. 1, 1959

2,914,918

GAS TURBINE JET ENGINE STARTER WITH SERIALLY-CONNECTED CONCENTRICALLY-ARRANGED COMBUSTION CHAMBERS

Leo I. Kaplan, Sunland, Calif., assignor to Poly Industries, Inc., a corporation of California Application December 28, 1955, Serial No. 555,803

18 Claims. (Cl. 60—39.17)

The present invention relates to gas turbines in general and particularly to a gas turbine designed for use as a jet engine starter. More specifically the invention comprises a gas turbine suitable for use as a jet engine starter which is small in size, has a low weight-to-power ratio in comparison with present jet engine electric starters, and which may be operated upon jet engine fuel.

This application is a continuation-in-part of my copending application Serial No. 297,548, now abandoned, filed July 7, 1952, for Gas Turbine Jet Engine Starter.

The starting of jet engines requires a large amount of power. At the present time electric starters are widely used in this connection but are objectionable due to their relatively great weight. Alternatively, energy for starting jet engines has been provided by sources such as cartridges and chemicals but these also have their disadvantageous features. In aircraft incorporating a jet engine there are obvious advantages in using the same kind of fuel to drive the starter for the aircraft engine. The gas turbine constructed in accordance with the present invention is relatively light in weight as compared to electric starters.

It is, accordingly, an object of the present invention to provide a gas turbine light in weight and small in size and suitable for use as a jet engine starter.

A further object of the invention is to provide a jet engine starter comprising a small gas turbine incorporating a centrifugal compressor to drive a gear reduction unit adapted to be temporarily coupled directly to the jet engine to be started.

A further object of the invention is to provide a gas turbine suitable for starting a jet engine and comprising a plurality of combustion chambers arranged concentrically and so connected that gas leaving a first stage combustion zone is reheated and then used to drive a second turbine which in turn drives the air supply compressor.

It is still a further object of the invention to provide a compact, small size, powerful gas turbine unit usable as a jet engine starter which incorporates first and second stage combustion zones and turbines, the gases from the first stage zone being reheated in the second stage combustion zone and the second stage turbine functioning to drive a compressor supplying air to the combustion zones.

Still another object of the invention is to provide a relatively small but powerful jet engine starter comprising a gas turbine in which a first stage turbine drives a speed reduction unit connected directly to the jet engine to be started, and in which the second stage turbine drives the centrifugal compressor and is also connected to a concentrically positioned electric motor for starting the gas turbine initially.

A still further object of the invention is to provide a gas turbine incorporating a reheat cycle and capable of furnishing a large amount of power without the necessity of high compression ratios or extremely high rotational speeds resulting in non-critical conditions in which extremely high stresses in metals and parts and extremely high temperatures, all as viewed in the field to which the invention relates, are eliminated, thereby permitting the use of relatively non-critical materials.

An additional object of the invention is to provide in a gas turbine starter for the exchange of heat between the products of combustion and the air supply to the combustion zones in a manner to achieve maximum overall efficiency.

In a preferred form, the gas turbine starter and reduction gear unit constructed in accordance with the present invention could have a torque of 900 foot pounds and a rotational speed of 3300 r.p.m. at the output shaft. Such a unit would be capable of delivering approximately 50 H.P. or more and would be more than adequate to start a "5000 lb. thrust class" jet engine. The use of such a unit should, under normal conditions, result in the starting of the jet engine in approximately 8 to 10 seconds. In over-all dimensions a typical starter constructed in accordance with the invention could be positioned within a cylinder 9 inches in diameter by approximately 12 inches in length and weighing about 60 pounds.

A relatively low compression ratio of about 3 to 1 is used. This ratio is well within the capacity of centrifugal compressors and sufficiently low as to insure relatively high efficiency. The mass flow of air for the typical unit described is about one pound per second. The turbine-operating temperatures are in the vicinity of 1600 degrees Fahrenheit or lower than present jet engine practice. A rotational speed of approximately 45,000 r.p.m. at the turbines, well within the range of present day bearings, is the speed at the input end of the gear reduction unit which may be of the conventional planetary gear type.

The above and other objects and advantages of the invention will be more fully set forth in the following specification and claims considered in connection with the attached drawings to which they relate.

In the drawings:

Figure 2 is a transverse sectional view taken along line 2—2 of Figure 1 and as viewed in the direction of the arrows; and Figure 3 is a fragmentary side elevational view of the right or compressor end of the showing of Figure 1.

Figure 1:
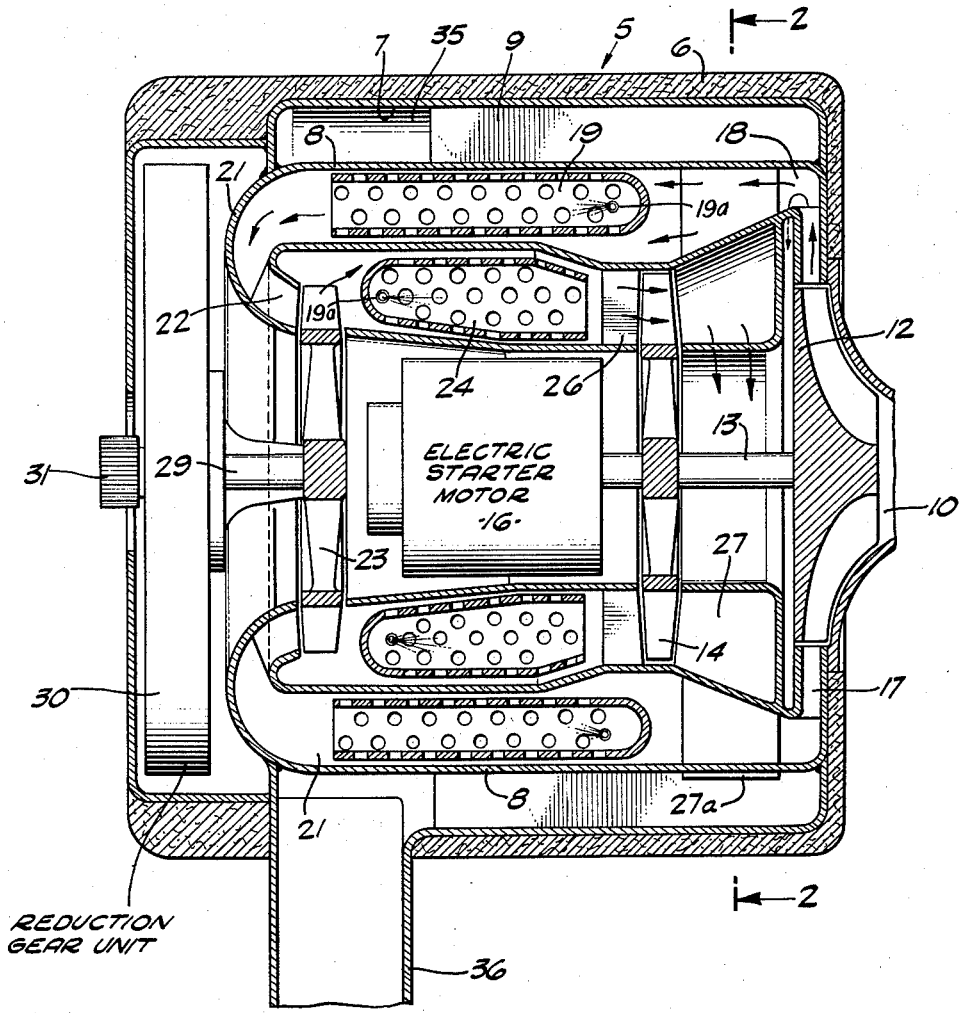
Figure 1 is a longitudinal central sectional view of the gas turbine of the invention, the showing being largely schematic.

Referring now to the drawings in which a preferred embodiment of the invention is illustrated, the unit constructed in accordance with a preferred form of the invention is illustrated. An exterior enclosing envelope or casing generally designated 5 includes an outer jacket 6 of heat insulation material applied directly to a metal shrouding 7 held concentrically spaced about the casing 8 of the starter unit by the radially disposed flow-directing fins 9. A centrifugal compressor rotor is indicated by the reference character 12 and is mounted upon a shaft 13 which also carries the second stage turbine rotor 14 and also the electric starter motor 16 suitably supported centrally within the cylindrical main casing 8. Air compressed and thrown outwardly by the centrifugal compressor 12 passes through the diffuser 17 and enters the forward ends of an annular duct 18 leading directly to the first stage combustion chambers 19 which are to be understood as being of conventional design. The annular exhaust duct 21 receives the hot gases issuing from chambers 19 and directs the axial gas flow inwardly through a nozzle or diffuser 22 and then axially through the vanes of the first stage turbine rotor 23.

The second stage or reheat combustion chambers are indicated by the reference character 24 and the gases passing through the turbine 23 exhaust directly into the annular chamber enclosing combustion chambers 24. It is to be understood that the circularly arranged combustion chambers 19 and 24 are generally similar and each comprises a tubular member closed at one end and provided throughout with a large number of perforations. The tubes of each group are suitably supported in equally spaced relation within the respective annular combustion zones and each tube includes the usual nozzle, fuel feeding, and mixing means 19a. The gases which have been partially cooled and expanded by their passage through the first stage turbine 23 are reheated by combustion chambers 24 within the second stage combustion zone and directed by exhaust passage 26 through the vanes of the second stage turbine rotor 14 to deliver power to that element which is connected, as described, through the shaft 13 to the air compressor rotor 12. The hot exhaust gases discharging from turbine rotor 14 enter the annular chamber 27 and pass radially therefrom through a plurality of ducts 27a of airfoil shape in cross section and extending crosswise of the annular compressed air passage 18, as best illustrated in Figure 3. It will be understood that ducts 27a conduct the hot exhaust gases radially across the axially flowing stream of compressed air discharging from the periphery of compressor rotor 12 and flowing into the intake of the outer or the first stage combustion zone in which combustion chambers 19 are located. In consequence, the incoming air is preheated by the waste heat carried in the exhaust gases. An additional part of this waste heat is recovered from the exhaust gases as they flow longitudinally of the starter unit between the concentrically-arranged walls 7 and 8 of heat economizer chamber 35 to an exhaust duct 36.

The first stage rotor 23 is connected by a shaft 29 to the reduction gear unit, indicated generally by the reference character 30, which is also to be understood as being conventional. The stub shaft-carried gear 31 is driven by the unit 30 at a speed greatly reduced from the speed of drive shaft 29 and is adapted to be temporarily coupled to a mating gear means of a jet engine while the engine is being started. It is to be understood that the mountings and support of the shafts may be conventional and that the disclosure is largely diagrammatic.

*Operation*

In the operation of the turbine constructed in accordance with the present invention, inlet 10 of the compressor unit is connected directly to a source of fresh air and, it being desired to start the unit, the electrical motor 16 is energized, whereupon the shaft 13 is rotated. Immediately the compressor rotor 12 rotates at high speed and discharges compressed air outwardly between vanes in an air diffuser 17 and then axially into heat exchange with the exterior of the hot exhaust gas ducts 27a extending across the annular passage 18. The preheated compressed air discharging from passage 18 enters the first stage combustion zone to form a combustible mixture with the fuel issuing from jets located within the closed ends of combustion chambers 19 and is ignited. Combustion is immediately begun and the burned fuel is exhausted through the exhaust passage 21 and nozzles 22 to the first stage rotor 23 and passes in contact with its vanes to effect the rotation of that member. Its rotation is, of course, effective to rotate shaft 29 which in turn actuates the power and speed reduction unit 30 resulting in the slower speed rotation of the power-transmitting gear 31.

The gases which have delivered power to the rotor 23 of the first stage turbine enter the annular second stage combustion zone containing combustion chambers 24 where they are reheated in the presence of further fuel combustion, the combined products making their exit through the exhaust passage 26 past the vanes of the second stage turbine rotor 14 to drive it. The electrical motor 16 is by this time de-energized and the rotor 14 delivers the power to the shaft 13 necessary to rotate the compressor rotor 12 to effect the continued operation of the unit. From the second stage turbine rotor 14 the gases enter the exhaust gas outlet ring 27 from which they pass radially into the numerous ducts 27a transversing the incoming stream of compressed air. As a result, large quantities of heat still present in the exhaust gases are transferred to the compressed air because of the intimate wiping contact with the opposite surfaces of ducts 27a with the high velocity of the gas flow. Additional quantities of the waste heat are recovered from the exhaust gases as they flow through heat economizer chamber 35 and to the exhaust duct 36 at the left-hand end of the heat economizer. In this connection, it will be understood that fins 9 projecting radially across the economizer chamber preferably have a good heat connection with the wall of the main casing and a poor heat transfer connection with metal shroud 7 thereby facilitating the transfer of heat to the first stage combustion zone. The operation is continuous in the manner described until the fuel supply to the combustion chambers is discontinued by the operator as the jet engine driven from the gear 31 starts operating.

The entire unit can be controlled from a distance and preferably from the cockpit of the airplane by the use of suitable controls for starting motor 16 and for supplying fuel to the combustion chambers 19 and 24. A conventional timing mechanism could be employed, if desired, to put the starter through its operating cycle. The fuel used in the unit is the aviation fuel carried for the propulsion jet engine and accordingly a maximum number of starts can be made without servicing the starter unit.

While the particular apparatus herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A gas turbine construction, comprising a centrifugal air compressor, a first turbine connected to drive said air compressor, an output shaft, a second turbine connected to drive said output shaft, said output shaft being independent of said air compressor and a pair of ducts having a common heat-conducting wall and each enclosing at least one combustion chamber, one of said ducts being connected to receive gases from the outlet of said air compressor and pass the same through its associated combustion chamber to the inlet of said second turbine, the other of said ducts being connected to receive gases from the outlet of said second turbine and pass the same through its associated combustion chamber to the inlet of said first turbine.

2. The invention as claimed in claim 1, wherein an exhaust conduit is provided to receive gases from the outlet of said first turbine, said exhaust conduit and said one of said ducts having at least one common heat-conducting wall adapted to preheat the gases passing from said air compressor to the combustion chamber in said one duct.

3. The invention as claimed in claim 1, wherein said ducts are concentric annuluses associated by a return-bent portion which forms the inlet nozzle for said second turbine.

4. The invention as claimed in claim 3, wherein an electric starter motor is mounted generally centrally of said ducts and operably connected to said air compressor.

5. A jet engine starter, which comprises a first shaft having a compressor rotor and a second stage turbine rotor mounted thereon, a second shaft in substantial axial alignment with said first shaft and having a power transmission unit and a first stage turbine rotor mounted thereon, said compressor rotor and said power transmission unit being relatively remote from each other and at the opposite ends of the starter, a first annular duct mounted generally concentrically of said first and second shafts and encompassing both of said turbine rotors, said first duct being connected to receive compressed gases from said compressor rotor and deliver the same to the inlet of said first stage turbine rotor, first combustion chamber means mounted within said first duct and concentrically thereof, a second annular duct mounted within said first duct and having its outer wall common with the inner wall of said first duct, said second duct being connected to receive exhaust gases from said first stage turbine rotor and deliver the same to said second stage turbine rotor, and second combustion chamber means mounted within said second duct and concentricaly thereof to reheat said exhaust gases.

6. The invention as claimed in claim 5, in which said first combustion chamber means is spaced a substantial distance from the inlet to said first duct and from said compressor rotor, and exhaust conduit means are mounted axially adjacent said compressor rotor and connected to receive exhaust gases from said second stage turbine rotor, said exhaust conduit means and said first duct having a common heat-conducting wall between said inlet and said first combustion chamber means to provide for the preheating of gases flowing to said first combustion chamber means.

7. The invention as claimed in claim 5, wherein a diffuser is provided between the outlet from said air compressor and the inlet to said first duct, and a return-bend nozzle passage is provided to direct gases from said first combustion chamber means to the inlet of said first stage turbine rotor.

8. The invention as claimed in claim 5, wherein an electric starter motor is mounted between said turbine rotors radially inwardly of said second duct, said starter motor being connected to said first shaft to effect commencement of starter operation.

9. A gas turbine jet engine starter comprising a pair of shafts, a second stage turbine rotor and an air compressor rotor secured to and spaced axially apart on one of said shafts, a first stage turbine rotor and an output speed reduction mechanism connected to said other shaft, means forming a plurality of concentric combustion zones in heat exchange with one another through a common separating wall, said first stage turbine rotor being positioned in the stream of combustion gases passing from one combustion zone to the other so as to be rotated by the flowing gases, said second stage turbine rotor being positioned in the path of the gases exhausting from the final one of said combustion zones so as to be rotated thereby to drive said air compressor, and means for delivering compressed air from said compressor in succession to said first and second combustion zones.

10. A gas turbine jet engine starter as defined in claim 9 including means for passing a plurality of streams of hot gas discharging from said second stage turbine and from the last one of said combustion zones into heat exchange with compressed air flowing from said compressor to said combustion zones.

11. A gas turbine jet engine starter as defined in claim 10 including a heat economizer surrounding the outer one of said concentric combustion zones and separated therefrom by a heat-conducting casing, and means for delivering said plurality of streams of exhaust gases to one end thereof and for discharging the gases to the atmosphere from another portion of the heat economizer.

12. A gas turbine jet engine starter as defined in claim 9 including a plurality of combustion chamber tubes extending axially of and arranged in rings within each of said combustion zones, the tubes in each zone having an open end and a substantially closed end with the open ends facing downstream in the direction of gas flow.

13. A gas turbine jet engine starter as defined in claim 12 including an imperforate heat transfer wall separating said combustion zones from one another as respects gas flow but providing for good heat exchange therebetween.

14. A gas turbine jet engine starter as defined in claim 9 wherein said speed-reduction mechanism is located at one axial end of said starter and said air compressor is located at the opposite end thereof.

15. A gas turbine jet engine starter as defined in claim 9 wherein the shaft supporting said second stage turbine rotor and said air compressor has an electric motor connected thereto for initiating the operation of said starter, said motor being housed centrally of said concentrically-arranged combustion chambers.

16. A gas turbine power package adapted for use in starting jet engines and other power applications comprising a tubular heat insulated housing enclosing a pair of concentrically arranged combustion chambers intermediate the opposite ends of said housing, turbine runner means rotatably supported at one end of said housing and including means for passing hot gases therethrough from one of said combustion chambers, a turbine-driven air compressor co-axially supported inwardly of the other end of said housing, means conducting compressed air discharging from said compressor through said one combustion chamber and then through said turbine runner means and through the other of said combustion chambers, and means conducting hot pressurized air and products of combustion from said other combustion chamber through the turbine portion of said turbine-driven compressor to drive the latter.

17. A gas turbine package as defined in claim 16 characterized in the provision of means for conducting the gases discharging from said last mentioned turbine in heat exchange with compressed air discharging from said compressor.

18. A gas turbine package as defined in claim 16 characterized in that said combustion chambers are disposed between said first and second mentioned turbines and in that said chambers have a common intervening heat exchange wall.

References Cited in the file of this patent

UNITED STATES PATENTS

| | | |
|---|---|---|
| 2,078,957 | Lysholm | May 4, 1937 |
| 2,399,046 | Larrecq | Apr. 23, 1946 |
| 2,432,177 | Sédille | Dec. 9, 1947 |
| 2,503,006 | Stalker | Apr. 4, 1950 |
| 2,543,864 | Melenric | Mar. 6, 1951 |
| 2,548,975 | Hawthorne | Apr. 17, 1951 |
| 2,589,078 | Hawthorne | Mar. 11, 1952 |
| 2,613,500 | Lysholm | Oct. 14, 1952 |

FOREIGN PATENTS

| | | |
|---|---|---|
| 1,046,175 | France | July 8, 1953 |